United States Patent
Reano et al.

(10) Patent No.: US 10,302,864 B2
(45) Date of Patent: May 28, 2019

(54) METHOD OF FORMING A DETERMINISTIC THIN FILM FROM A CRYSTAL SUBSTRATE BY ETCHING A BILAYER BONDING INTERFACE TO CREATE A CHANNEL

(71) Applicant: Ohio State Innovation Foundation, Columbus, OH (US)

(72) Inventors: Ronald M. Reano, Columbus, OH (US); Li Chen, Edison, NJ (US)

(73) Assignee: Ohio State Innovation Foundation, Columbus, OH (US)

( * ) Notice: Subject to any disclaimer, the term of this patent is extended or adjusted under 35 U.S.C. 154(b) by 0 days.

(21) Appl. No.: 15/612,087

(22) Filed: Jun. 2, 2017

(65) Prior Publication Data
US 2017/0351027 A1 Dec. 7, 2017

Related U.S. Application Data

(60) Provisional application No. 62/344,464, filed on Jun. 2, 2016.

(51) Int. Cl.
*C30B 33/06* (2006.01)
*G02B 6/134* (2006.01)
(Continued)

(52) U.S. Cl.
CPC .............. *G02B 6/1347* (2013.01); *G02B 6/12* (2013.01); *G02B 6/126* (2013.01); *G02B 6/132* (2013.01);
(Continued)

(58) Field of Classification Search
CPC ......... C30B 25/00; C30B 25/02; C30B 25/04; C30B 25/18; C30B 25/183; C30B 25/186;
(Continued)

(56) References Cited

U.S. PATENT DOCUMENTS

| | | |
|---|---|---|
| 5,267,336 A | 11/1993 | Sriram et al. |
| 5,416,859 A | 5/1995 | Burns et al. |

(Continued)

FOREIGN PATENT DOCUMENTS

| | | | |
|---|---|---|---|
| WO | 00/61841 | 10/2000 | |
| WO | WO-2014047443 A1 * | 3/2014 | ........... H01L 31/105 |

OTHER PUBLICATIONS

Rabiei, et al. publication entitled "Optical and electro-optical properties of submicrometer lithium niobate slab waveguides prepared by crystal ion slicing and wafer bonding," Appl. Phys. Lett., vol. 85, pp. 4603-4605 (2004). (Year: 2004).*

(Continued)

*Primary Examiner* — Kenneth A Bratland, Jr.
(74) *Attorney, Agent, or Firm* — Meunier Carlin & Curfman LLC

(57) ABSTRACT

An example method of forming a deterministic thin film from a crystal substrate is described herein. The method can include implanting ions into a surface of the crystal substrate to form a thin film crystal layer, and bonding the crystal substrate and a handle substrate to form a bilayer bonding interface between the crystal substrate and the handle substrate. The method can also include exfoliating the thin film crystal layer from the crystal substrate, patterning the thin film crystal layer to define a deterministic thin film, etching one or more trenches in the thin film crystal layer, etching the bilayer bonding interface via the one or more trenches, and releasing the deterministic thin film from the handle substrate.

15 Claims, 10 Drawing Sheets

(51) Int. Cl.
G02B 6/126 (2006.01)
G02B 6/136 (2006.01)
G02B 6/132 (2006.01)
G02F 1/035 (2006.01)
G02B 6/12 (2006.01)

(52) U.S. Cl.
CPC ............. G02B 6/136 (2013.01); G02F 1/035 (2013.01); G02B 2006/1204 (2013.01); G02B 2006/12042 (2013.01); G02B 2006/12045 (2013.01); G02B 2006/12078 (2013.01); G02F 2202/20 (2013.01)

(58) Field of Classification Search
CPC ......... C30B 25/22; C30B 29/00; C30B 29/10; C30B 29/16; C30B 29/22; C30B 29/30; C30B 31/00; C30B 31/20; C30B 31/22; C30B 33/00; C30B 33/02; C30B 33/06; C30B 33/08; C30B 33/10; C30B 33/12; G02B 6/126; G02B 6/132; G02B 6/1347; G02B 6/136; G02F 1/035; G02F 2202/20
USPC ..... 117/84, 87–90, 92, 94–95, 97, 101, 103, 117/106, 108, 902, 937, 948
See application file for complete search history.

(56) References Cited

U.S. PATENT DOCUMENTS

| | | | |
|---|---|---|---|
| 6,540,827 | B1 | 4/2003 | Levy et al. |
| 7,035,489 | B2 | 4/2006 | Glebov et al. |
| 7,693,356 | B2 | 4/2010 | Gilardi et al. |
| 7,970,241 | B2 | 6/2011 | Chen et al. |
| 8,368,995 | B2 | 2/2013 | Dallesasse et al. |
| 8,380,016 | B1 | 2/2013 | Hochberg et al. |
| 8,909,003 | B1 | 12/2014 | Hochberg et al. |
| 2008/0165565 | A1 | 7/2008 | Gunter et al. |
| 2018/0005815 | A1* | 1/2018 | Wang ................. H01L 21/0243 |

OTHER PUBLICATIONS

F. Niklaus, et al. publication entitled "Adhesive wafer bonding using partially cured benzocyclobutene for three-dimensional integration," Journal of the Electrochemical Society, vol. 153, pp. G291-G295 (2006). (Year: 2006).*
Srico.com Products website, available: http://www.srico.com/about-us/ (accessed Jan. 9, 2018).
Solal et al., "Oriented lithium niobate layers transferred on 4" (100) silicon wafer for RF SAW devices", IEEE Ultrasonics Symposium, 2002, 131-134.
Stenger, et al., "Integrated RF Photonic Devices Based on Crystal Ion Sliced Lithium Niobate", SPIE 862401, 2013, 8 pages.
R. Soref, "The past, present, and future of silicon photonics," IEEE J. Sel. Top. Quantum Electron. 12(6), 1678-1687 (2006).
M. J. R. Heck et al., "Hybrid Silicon Photonics for Optical Interconnects," IEEE J. Sel. Top. Quantum Electron. 17(2), 333-346 (2011).
Y.-H. Kuo et al., "Strong quantum-confined Stark effect in germanium quantum-well structures on silicon," Nature 437(7063), 1334-1336 (2005).
C. Koos et al., "All-optical high-speed signal processing with silicon organic hybrid slot waveguides," Nat. Photonics 3(4), 216-219 (2009).
S. Abel et al., "A strong electro-optically active lead-free ferroelectric integrated on silicon," Nat. Commun. 4, (2013).
R. M. Briggs et al., "Compact silicon photonic waveguide modulator based on the vanadium dioxide metal-insulator phase transition," Opt. Express 18(11), 11192-11201 (2010).
M. Liu et al., "A graphene-based broadband optical modulator," Nature (2011).

A. W. Fang et al., "Electrically pumped hybrid AlGaInAs-silicon evanescent laser," Opt. Express 14(20), 9203-9210 (2006).
Y.-H. Kuo et al., "High speed hybrid silicon evanescent electroabsorption modulator," Opt. Express 16(13), 9936-9941 (2008).
J. Michel et al., "High-performance Ge-on-Si photodetectors," Nat. Photonics 4(8), 527-534 (2010).
J. N. Caspers et al., "Compact hybrid plasmonic polarization rotator," Opt. Lett. 37(22), 4615-4617 (2012).
P. Rabiei et al., "Heterogeneous lithium niobate photonics on silicon substrates," Opt. Express 21(21), 25573-25581 (2013).
Y. S. Lee et al., "Hybrid Si—LiNbO$_3$ microring electro-optically tunable resonators for active photonic devices," Opt. Lett. 36(7), 1119-1121 (2011).
L. Chen and R. M. Reano, "Compact electric field sensors based on indirect bonding of lithium niobate to silicon microrings," Opt. Express 20(4), 4032-4038 (2012).
L. Chen et al., "12.5 pm/V hybrid silicon and lithium niobate optical microring resonator with integrated electrodes," Opt. Express 21(22), 27003-27010 (2013).
L. Chen et al., "Hybrid silicon and lithium niobate electro-optical ring modulator," Optica, 112-118 (2014).
L. Chen et al., "Compensating thermal drift of hybrid silicon and lithium niobate ring," Opt. Lett. 40(7), 1599-1602 (2015).
L. Chen et al., "Highly linear ring modulator from hybrid silicon and lithium niboate," Opt. Express 23(10), 13255-13264 (2015).
E. L. Wooten et al., "A review of lithium niobate modulators for fiber-optic communications systems," IEEE J. Sel. Top. Quantum Electron. 6(1), 69-82 (2000).
R. S. Weis and T. K. Gaylord, "Lithium niobate: summary of physical properties and crystal structure," Appl. Phys., A Mater. Sci. Process. 37(4), 191-203 (1985).
M. Levy et al., "Fabrication of single-crystal lithium niobate films by crystal ion slicing," Appl. Phys. Lett. 73(16), 2293-2295 (1998).
F. Schrempel et al., "Ultrathin membranes in x-cut lithium niobate," Opt. Lett. 34(9), 1426-1428 (2009).
M. Koechlin et al., "Free-standing lithium niobate microring resonators for hybrid integrated optics," IEEE Photon. Technol. Lett. 22(4), 251-253 (2010).
A. Guarino et al., "Electro-optically tunable microring resonators in lithium niobate," Nat. Photonics (2007).
P. Rabiei and P. Gunter, "Optical and electro-optical properties of submicrometer lithium niobate slab waveguides prepared by crystal ion slicing and wafer bonding," Appl. Phys. Lett. 85(20), 4603-4605 (2004).
M. G. Wood et al., "Optimization of electron beam patterned hydrogen silsesquioxane mask edge roughness for low-loss silicon waveguides", J. Nanophoton. 8(1), 083098 (2014).
F. Niklaus et al., "Adhesive wafer bonding using partially cured benzocyclobutene for three-dimensional integration," J. Electrochem. Soc. 153(4), G291-G295 (2006).
P. Sun and R. M. Reano, "Cantilever couplers for intra-chip coupling to silicon photonic integrated circuits," Opt. Express 17(6), 4565-4574 (2009).
S.-I. Park et al., "Printed assemblies of inorganic light-emitting diodes for deformable and semitransparent displays," Science, 325(5943), 977-981 (2009).
J. A. Rogers et al., "Synthesis, assembly and applications of semiconductor nanomembranes," Nature 477(7362), 45-53 (2011).
J. Hu et al., "Flexible integrated photonics: where materials mechanics and optics meet," Opt. Mater. Express 3(9), 1313-1331 (2013).
R. M. Roth et al., "Integrable wide-free-spectral-range Fabry-Perot optical filters using freestanding LiNbO$_3$ thin films," Opt. Lett. 30(9), 994-996 (2005).
A. M. Radojevic et al., "Zeroth-order half-wave plates of LiNbO$_3$ for integrated optics applications at 1.55 μm," IEEE Photon. Technol. Lett. 12(12), 1653-1655 (2000).
H. Yamazaki et al., "Integrated 100-Gb/s PDM-QPSK modulator using a hybrid assembly technique with silica-based PLCs and LiNbO$_3$ phase modulators," in Proc. Eur. Conf. Opt. Commun., Sep. 2008, Paper Mo.3.C.1.
A. Reinhardt et al., "Acoustic filters based on thin single crystal LiNbO$_3$ films: status and prospects," in 2014 IEEE International Ultrasonics Symposium Proceedings, 773-781, (2014).

(56) References Cited

OTHER PUBLICATIONS

T. Izuhara et al., "Single-crystal barium titanate thin films by ion slicing," Appl. Phys. Lett. 82(4), 616-618 (2003).

* cited by examiner

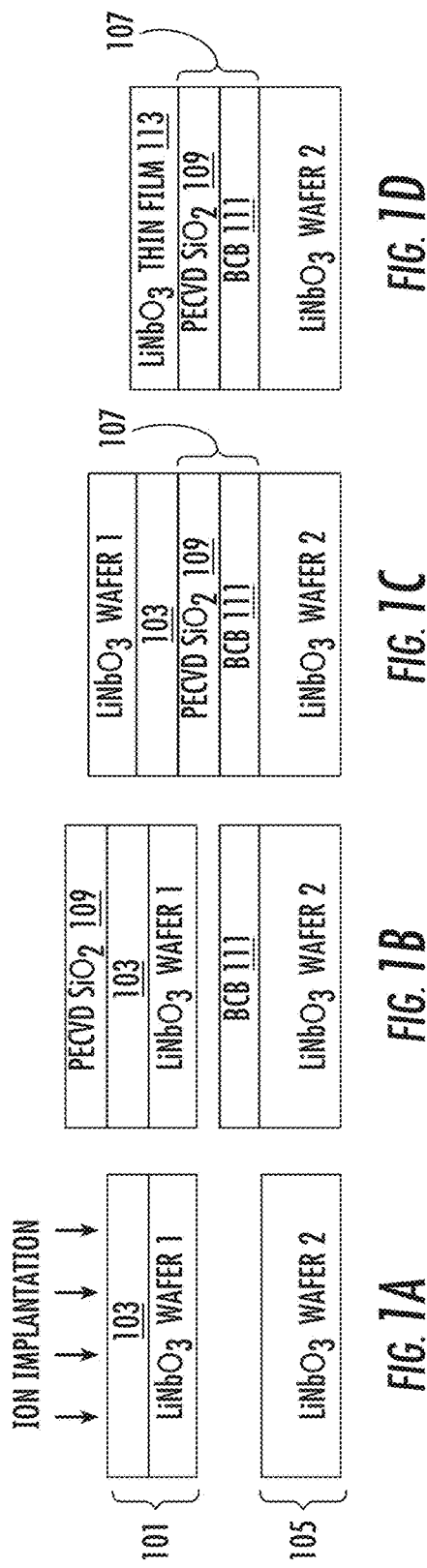

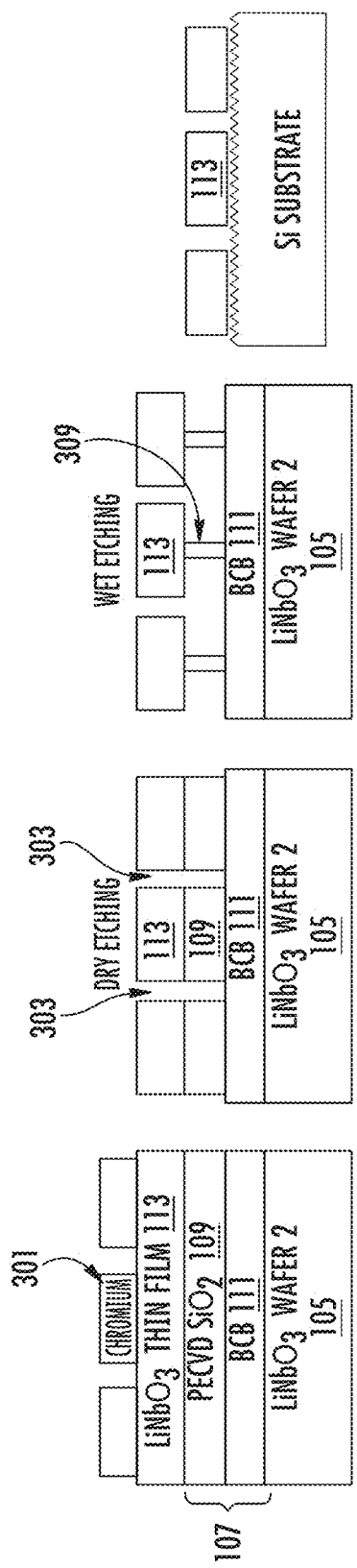

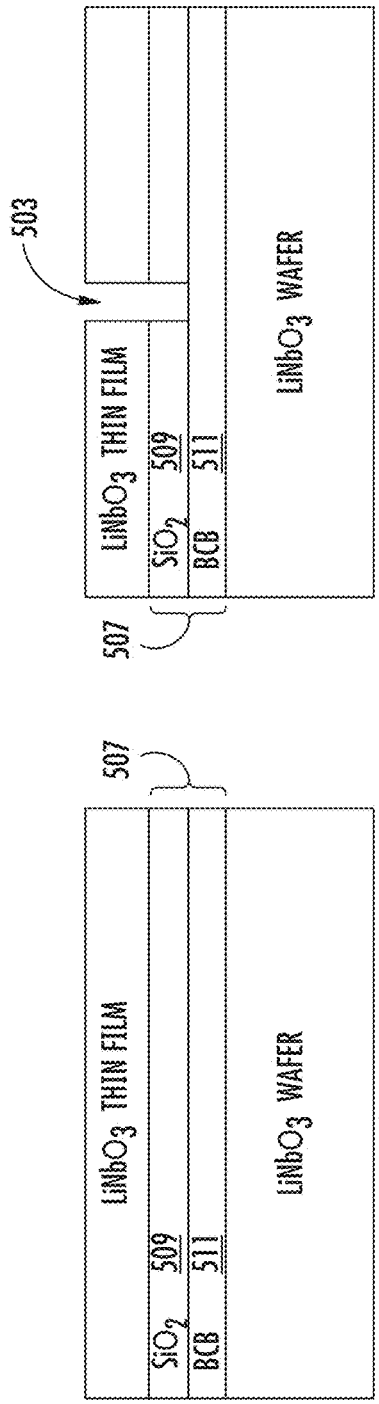
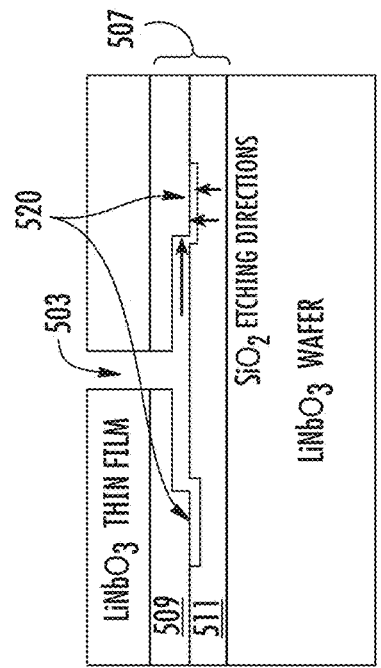

STARTING SAMPLE

PATTERN LiNbO₃ THIN FILM

WET ETCHING SiO₂

STARTING SAMPLE

PATTERN LiNbO$_3$ THIN FILM

DRY ETCHING BCB

METHOD OF FORMING A DETERMINISTIC THIN FILM FROM A CRYSTAL SUBSTRATE BY ETCHING A BILAYER BONDING INTERFACE TO CREATE A CHANNEL

CROSS-REFERENCE TO RELATED APPLICATIONS

This application claims the benefit of U.S. Provisional Patent Application No. 62/344,464, filed on Jun. 2, 2016, entitled "METHODS FOR PROVIDING PATTERNED ION-SLICED CRYSTAL FOR HYBRID PHOTONIC INTEGRATION ON SILICON," the disclosure of which is expressly incorporated herein by reference in its entirety.

STATEMENT REGARDING FEDERALLY FUNDED RESEARCH

This invention was made with government support under Grant no. W911NF-12-1-0488 awarded by the Army Research Office. The government has certain rights in the invention.

BACKGROUND

Photonic integration has been driven by the ever growing demand for smaller size, lower cost, lower power consumption, easier assembly, higher reliability, and greater data density in modern photonic devices and systems. Among the many platforms, silicon photonics is particularly promising for photonic integration due to the leveraging of existing electronic integrated circuit facilities for large-scale manufacturing [1]. Monolithic integration in silicon is challenging, however, due to the limited active properties of silicon, thereby creating a need for hybrid integration [2]. Materials integrated on silicon include semiconductors, polymers, ferroelectric oxides, metal oxides, graphene and so on [2-7]. A variety of hybrid integrated photonic devices have been demonstrated on the silicon platform including lasers, detectors, modulators, amplifiers, tunable filters, and polarization rotators [8-11].

The lack of a second order susceptibility in unstrained silicon is one of the drivers for hybrid integration [12]. Recently, a hybrid silicon and $LiNbO_3$ material system has been introduced by bonding ion-sliced $LiNbO_3$ to silicon waveguides, enabling compact sensors, filters, and modulators on silicon based on the second order susceptibility of $LiNbO_3$ [13-18]. Hybrid $Si/LiNbO_3$ modulators have the potential to advance the state of the art with respect to speed, linearity, chirp, insertion loss, and power consumption [16, 19]. More broadly, $Si/LiNbO_3$ devices with advanced functionalities are envisioned that exploit the well-understood electro-optical, piezoelectric, and nonlinear optical properties of $LiNbO_3$ [20, 21].

For hybrid integration, ion-sliced $LiNbO_3$ platelets have been produced by ion implantation on $LiNbO_3$ wafers followed by either wet etching or thermal blistering treatment [13-17, 22]. During wet etching, lateral etching of the damage layer introduced by ion implantation results in the exfoliation of $LiNbO_3$ platelets from the bulk wafer. The etching rate depends on the crystal orientation and is as low as 100 nm $min^{-1}$ for x-cut $LiNbO_3$ [23]. Furthermore, the achievable platelet area decreases as the thickness decreases. For thermal treatment, the wafer surface blisters into random platelets due to thermal stress. While submicrometer thick $LiNbO_3$ with edge lengths in the range of tens of microns to hundreds of microns can be obtained, the resulting random platelets exhibit uncontrolled size, shape, and unknown orientation of the crystal axes. For example, $LiNbO_3$ platelets having various widths of about 15-100 micrometers and various lengths of about 0.1-2 mm with unknown crystal orientation can result. The lack of control of the ion-sliced $LiNbO_3$ limits the fabrication yield, device size, and design flexibility of $Si/LiNbO_3$ devices. Particularly, electro-optic devices with electric fields applied along the z-axis for efficient modulation cannot be realized using a random platelet with unknown z-axis.

SUMMARY

Described herein is a method to obtain patterned thin films from crystalline substrates. Instead of randomly sized platelets obtained using the conventional techniques described above, the method produces thin films with controlled size, shape, and crystal orientation. The patterned thin films enable hybrid integrated photonics that exploit the electro-optical and nonlinear optical properties of crystals such as lithium niobate. For example, the patterned thin films can be used to create a host of chip-scale devices including modulators, switches, filters, sensors, wavelength converters, photodetectors, light emitting diodes, and lasers for various communications, computing, and sensing applications.

An example method of forming a deterministic thin film from a crystal substrate is described herein. The method can include implanting ions into a surface of the crystal substrate to form a thin film crystal layer, and bonding the crystal substrate and a handle substrate to form a bilayer bonding interface between the crystal substrate and the handle substrate. The method can also include exfoliating the thin film crystal layer from the crystal substrate, patterning the thin film crystal layer to define a deterministic thin film, etching one or more trenches in the thin film crystal layer, etching the bilayer bonding interface via the one or more trenches, and releasing the deterministic thin film from the handle substrate.

Additionally, the deterministic thin film can have deterministic size, shape, and crystal orientation. For example, the deterministic thin film can optionally include at least one edge having a length greater than about 0.1 micrometers (µm). Alternatively or additionally, the deterministic thin film can optionally have an area of square centimeter scale. Alternatively or additionally, the deterministic thin film can optionally have a thickness of micrometer scale. Alternatively or additionally, the deterministic thin film can optionally be x-cut, y-cut, z-cut, or other cut orientation.

Alternatively or additionally, in some implementations, patterning the thin film crystal layer to define a deterministic thin film further includes providing an orientation identification line for aligning crystal orientation.

Alternatively or additionally, the method can further include depositing a sacrificial layer onto the surface of the crystal substrate, and coating a layer of benzocyclobutene (BCB) onto a surface of the handle substrate. The sacrificial layer and the layer of BCB can form the bilayer bonding interface. Alternatively or additionally, in some implementations, etching the bilayer bonding interface via the one or more trenches further includes wet etching the sacrificial layer. Optionally, wet etching further includes using hydrofluoric (HF) acid, potassium hydroxide (KOH), or hydrogen chloride (HCl) acid as an etchant. Alternatively or additionally, in some implementations, etching the bilayer bonding interface via the one or more trenches further includes dry etching the layer of BCB. Optionally, dry etching further includes plasma etching. Alternatively or additionally, the sacrificial layer can be a dielectric material or a metal. For example, the sacrificial layer can optionally be silicon dioxide ($SiO_2$), aluminum oxide ($Al_2O_3$), or titanium.

Alternatively or additionally, the crystal substrate can be lithium niobate ($LiNbO_3$), lithium tantalate ($LiTaO_3$), barium titanate ($BaTiO_3$), strontium titanate ($SrTiO_3$), $Bi_{12}SiO_{20}$ (BSO), $KTaO_3$, silicon, germanium, gallium arsenide, indium gallium arsenide, silicon carbide, sapphire, potassium titanyl phosphate (KTP), or yttrium aluminum garnet (YAG).

An example method for producing an integrated optical device is also described herein. The method can include providing a patterned substrate, and bonding a deterministic thin film to the patterned substrate. The deterministic thin film can serve as cladding for an optical waveguide. Optionally, optical waveguides can be patterned in the deterministic thin film prior to, or after, bonding to the patterned substrate. Example optical waveguides that can be patterned in the deterministic thin film include, but are not limited to, ridge waveguide cores, rib waveguide cores, strip waveguide cores, titanium diffused waveguides, and waveguides formed by proton exchange. This disclosure contemplates that the deterministic thin film can be formed as described herein. Additionally, the integrated optical device can be at least one of a modulator, a switch, a sensor, an amplifier, a polarization rotator, a tunable filter, a wavelength converter, a photodetector, a light emitting diode, or a laser.

An example heterogeneous integrated photonic device is also described herein. The photonic device can include a substrate having a waveguide patterned on a surface thereof, and an x-cut thin film crystal arranged on the substrate. The x-cut thin film crystal can at least partially overlap with the waveguide. The x-cut thin film crystal in this case serves as cladding for an optical waveguide.

Additionally, respective polarization directions of an electric field and an optical field of the heterogeneous integrated photonic device are co-linear. Alternatively or additionally, the x-cut thin film crystal can have an area greater than about 0.01 square micrometers ($\mu m^2$).

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

FIGS. 1A-1D illustrate ion-sliced $LiNbO_3$ exfoliation. FIG. 1A illustrates $He^+$ ion implantation on wafer 1 (e.g., a crystal substrate as described herein), FIG. 1B illustrates PECVD $SiO_2$ deposition on wafer 1 and BCB spin-coating on wafer 2 (e.g., a handle substrate as described herein), FIG. 1C illustrates wafer bonding and annealing, and FIG. 1D illustrates exfoliation of ion-sliced $LiNbO_3$ (e.g., a thin film crystal layer as described herein).

FIGS. 3A-3D illustrate patterned ion-sliced $LiNbO_3$ fabrication flow. FIG. 3A illustrates patterning a chromium (Cr) mask; FIG. 3B illustrates dry etching of $LiNbO_3$; FIG. 3C illustrates wet etching of PECVD $SiO_2$; and FIG. 3D illustrates transferring $LiNbO_3$ to an unpolished silicon substrate.

FIGS. 5A-5C illustrate an example method of forming a deterministic thin film from a crystal substrate.

FIG. 8A illustrates silicon strip patterned on silicon-on-insulator wafer using EBL and plasma etching; FIG. 8B illustrates spin-coat, partial curing, and etch back of BCB; FIG. 8C illustrates bonding of $LiNbO_3$ and plasma etch of BCB; FIG. 8D illustrates deposition of PECVD $SiO_2$ and removal of $SiO_2$ above the resonator; FIG. 8E illustrates patterning of signal electrode; and FIG. 8F illustrates patterning of ground electrode and cantilever couplers.

FIG. 10A illustrates optical transmission. FIG. 10B illustrates wavelength detuning with voltage as parameter.

DETAILED DESCRIPTION

Figure 2B:
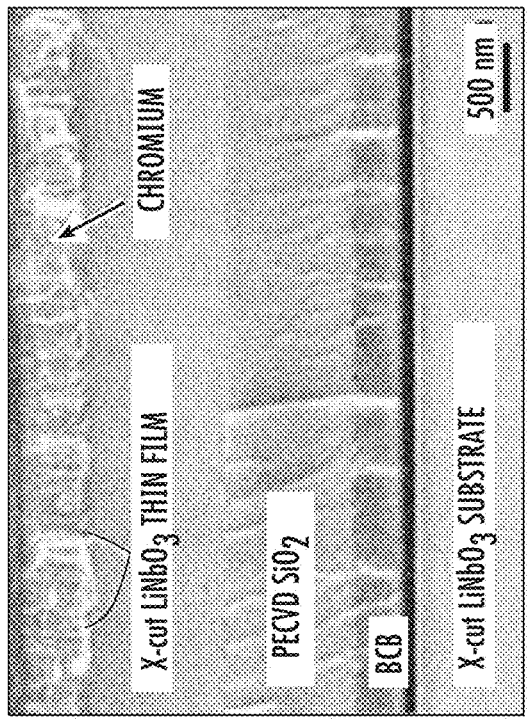
FIG. 2B is a scanning electron micrograph (SEM) of the cross-section of the thin film stack. The dark line in the BCB layer is due to charging during the scanning electron microscopy.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. While implementations will be described for forming patterned thin films of ion-sliced $LiNbO_3$, it will become evident to those skilled in the art that the implementations are not limited thereto.

A method of forming deterministic thin films from a crystal substrate is described herein. Optionally, the method can be used to form a patterned thin film of ion-sliced $LiNbO_3$. Using the techniques described herein, a patterned thin film of $LiNbO_3$ with deterministic size, shape, and crystal orientation can be obtained. As used herein, deterministic means not random. In other words, the size, shape, and crystal orientation of the thin film LiNbO$_3$ can be controlled. The patterned thin film can have a thickness of micrometer scale. For example, the patterned thin film can have a thickness greater than about 100 nanometers (nm). It should be understood that 100 nm is provided only as an example thickness for the thin film and that the thin film can have other thicknesses, for example, a thickness up to about 10 micrometers (μm) (and possibly even more). Optionally, in some implementations, the patterned thin film can have a thickness of about 1 μm or less. In addition, the patterned thin film can have edge lengths (e.g., length and/or width) greater than about 100 nm. It should be understood that 100 nm is provided only as an example edge length for the thin film and that the edge length can have other dimensions, for example, an edge length of several centimeters (cm) (and possibly even more). Optionally, in some implementations, the patterned thin film can include at least one edge having a length greater than about 0.1 micrometers (μm). Thus, the length and/or width of the patterned thin film can be greater than about 0.1 μm. Optionally, in other implementations, the patterned thin film can include at least one edge having a length greater than about 2 millimeters (mm), e.g., 2 mm, 3 mm, 4 mm, etc. Thus, the length and/or width of the patterned thin film can be greater than about 2 mm. Alternatively or additionally, the patterned thin film can have an area greater than about 0.01 μm$^2$. It should be understood that 0.01 μm$^2$ is provided only as an example area for the thin film and that the thin film can have other areas, for example, an area up to about tens of cm$^2$ (and possibly even more). Optionally, in some implementations, the patterned thin film can have an area of square centimeter scale. In some implementations, the thin film can be x-cut. Alternatively, in some implementations, the thin film can be y-cut. Alternatively, in some implementations, the patterned thin film can be z-cut. This disclosure contemplates that the patterned thin film can have deterministic size, shape, and/or crystal orientation other than the examples provided herein. The patterned thin film of LiNbO$_3$ can be transferred and bonded to a patterned substrate, for example, using a pick-and-place process. A patterned substrate (e.g., silicon on insulator) can have waveguides patterned thereon, for example, as described below with regard to FIGS. 8A-8F. The patterned thin film of LiNbO$_3$ can be picked-and-placed over the substrate. It should be understood that the patterned thin film of LiNbO$_3$ serves as cladding for the optical waveguides. For example, a tunable hybrid silicon and LiNbO$_3$ racetrack resonator can be designed, fabricated, and measured based on x-cut ion-sliced LiNbO$_3$ using the techniques described herein. Optionally, optical waveguides can be patterned in the thin film of LiNbO$_3$ prior to, or after, bonding to the patterned substrate. Example optical waveguides that can be patterned in the LiNbO$_3$ thin film include, but are not limited to, ridge waveguide cores, rib waveguide cores, strip waveguide cores, titanium diffused waveguides, and waveguides formed by proton exchange.

Patterned Ion-Sliced LiNbO$_3$

The process to obtain patterned ion-sliced LiNbO$_3$ (e.g., a crystal substrate) is illustrated in FIGS. 1A-1D using x-cut LiNbO$_3$ wafers as an example. The x-cut LiNbO$_3$ sample (e.g., a crystal substrate; LiNbO$_3$ wafer 1) is implanted with helium ions (He$^+$) on a surface thereof as shown in FIG. 1A with an implantation energy of 380 keV and a fluence of $3.5 \times 10^{16}$ ions cm$^{-2}$. The crystal substrate 101 is labeled in FIG. 1A for reference. The ion implantation process can be controlled to achieve an ion-damaged layer (or damage layer) having the desired thin film thickness (e.g., ~1 μm or less). In other words, the He ions can be implanted to produce the damage layer in the crystal substrate at a depth about equal to the desired thickness of the thin film. The damage layer 103 is labeled in FIGS. 1A-1C for reference. During ion implantation, silver (Ag) paste is applied between the LiNbO$_3$ sample and the sample holder to enhance thermal dissipation. The beam current density is maintained at 0.25 μA cm$^{-2}$, and the total implantation time is seven hours. The temperature of the wafer holder increases gradually during the implantation but remains below 100° C.

As described below, the LiNbO$_3$ sample is bonded to a LiNbO$_3$ handle wafer (e.g., a handle substrate; LiNbO$_3$ wafer 2) as part of the process for patterning LiNbO$_3$ thin films. The handle substrate 105 is labeled in FIG. 1A for reference. When the LiNbO$_3$ sample and the LiNbO$_3$ handle wafer are bonded, a bilayer bonding interface is formed there between. The bilayer bonding interface 107 is labeled for reference in FIGS. 1C and 1D. The bilayer bonding interface 107 includes at least two different materials. The materials of the bilayer bonding interface 107 facilitate etching of patterned thin films as described below, for example, with reference to FIGS. 5 and 7. In some implementations, as shown in FIG. 1B, the bilayer bonding interface 107 includes a sacrificial layer, which is deposited onto a surface of the LiNbO$_3$ sample, and a layer of BCB, which is coated on the LiNbO$_3$ handle wafer. The sacrificial layer 109 and the layer of BCB 111 are labeled in FIGS. 1B-1D for reference. As described below, the sacrificial layer 109 can be made of materials including, but not limited to, silicon dioxide (SiO$_2$), aluminum oxide (Al$_2$O$_3$), or titanium (Ti). Additionally, the layer of BCB 111 can optionally be another suitable material including, but not limited to, polymers, polyimides, and epoxies such as SU-8, polymethylmethacrylate (PMMA), polydimethylsiloxane (PDMS), methylsilsesquioxane (MSSQ), and polyetheretherketone (PEEK).

After ion implantation, the LiNbO$_3$ sample is cleaned using RCA1 solution and clad with 1 μm of plasma enhanced chemical vapor deposition (PECVD) SiO$_2$ on the surface thereof, i.e., the same surface of the LiNbO$_3$ sample on which ions are implanted, as shown in FIG. 1B. The PECVD SiO$_2$ layer can serve as a sacrificial layer to release the ion-sliced LiNbO$_3$ later in the process. A second x-cut LiNbO$_3$ handle wafer (e.g., a handle substrate; LiNbO$_3$ wafer 2) is cleaned with RCA1 and coated with adhesion promoter (Dow Chemical AP3000) and benzocyclobutene (BCB) (Dow Chemical CYCLOTENE 3022-35) as shown in FIG. 1B. As noted above, the handle substrate 105 is labeled in FIG. 1A for reference. This disclosure contemplates that the handle substrate can be coated with other suitable materials (i.e., other than BCB) including, but not limited to, polymers, polyimides, and epoxies such as SU-8, polymethylmethacrylate (PMMA), polydimethylsiloxane (PDMS), methylsilsesquioxane (MSSQ), and polyetheretherketone (PEEK). The implanted wafer (LiNbO$_3$ wafer 1) is coated with adhesion promoter and bonded to the LiNbO$_3$ handle wafer (LiNbO$_3$ wafer 2) via the BCB film as shown in FIG. 1C. The sacrificial layer (i.e., the layer of PECVD SiO$_2$) and the layer of BCB form a bonding interface pair or sacrificial/BCB double layer. This is also sometimes referred to herein as the "bilayer bonding interface." As noted above, the bilayer bonding interface 107 is labeled in FIGS. 1C and 1D for reference. The crystal z axes of the wafers, which are along the edges of the wafers, are aligned to each other under a microscope. The bonded wafer pair is heated gradually to 300° C. in an oven in an N$_2$ ambient. First, the oven temperature is ramped to 200° C. linearly from room temperature over a period of one hour. The sample is then held at 200° C. for one hour. The temperature is then increased by 10° C. every hour until a final temperature of 250° C. is reached, where the sample is held at 250° C. for one hour [24]. During the ramping process, the BCB is fully cured, strengthening the bond. Concurrently, micro-bubbles are formed in the ion-damaged layer, leading to exfoliation of the implanted layer [24]. Finally, the bonded wafer pair is heated to 300° C. over a period of 2 hours and held for one hour. As a result, 1.1 μm thick ion-sliced LiNbO$_3$ is exfoliated from the implanted wafer (LiNbO$_3$ wafer 1) as shown in FIG. 1D. The exfoliated thin film crystal layer 113 is labeled in FIG. 1D for reference. As described above, the thickness of the exfoliated thin film 113 is determined by the ion implantation process used to obtain the damage layer 103 in FIGS. 1A-1C.

Figure 2A:
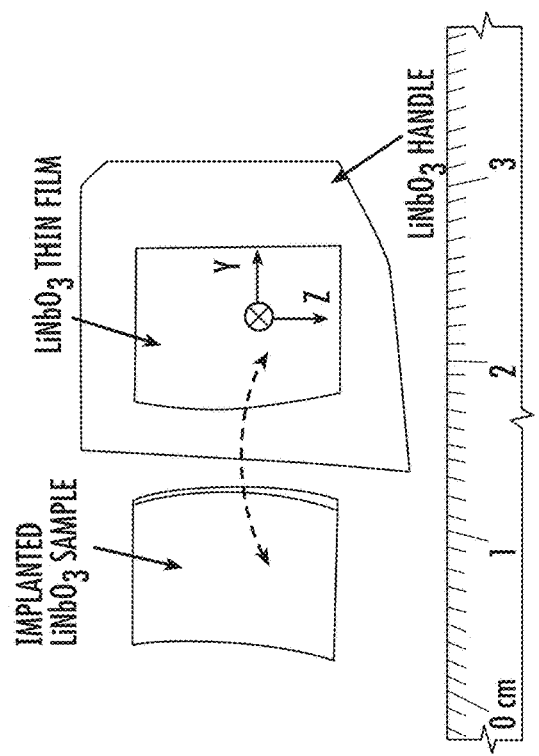
FIG. 2A illustrates X-cut ion-sliced $LiNbO_3$ bonded to a $LiNbO_3$ handle substrate. The wafers are diced into rectangular samples for identification and alignment of the crystal z-axes.

FIG. 2A illustrates a LiNbO$_3$ thin film transferred to an LiNbO$_3$ handle wafer. As shown in FIG. 2A, the cross sectional area of the LiNbO$_3$ thin film is approximately 0.85 cm by 1.2 cm. A thin film stack of ion-sliced LiNbO$_3$, PECVD SiO$_2$, and BCB is formed on the surface of the handle wafer, as shown in FIG. 2B. The root mean square (rms) surface roughness of the transferred thin film is 39 nm, measured with atomic force microscopy. In contrast, z-cut ion-sliced LiNbO$_3$ bonded to a z-cut LiNbO$_3$ wafer using the same fabrication process results in a roughness of 6 nm rms. The difference is attributed to crystalline anisotropy [20]. The surface roughness can be reduced to sub-nanometer level by chemical mechanical polishing [26].

Referring now to FIGS. 3A-3D, the areal shape of the ion-sliced LiNbO$_3$ is defined by a chromium (Cr) mask patterned by electron beam lithography (EBL) and plasma etching. It should be understood that FIGS. 3A-3D are used to illustrate steps of the process following those described with respect to FIGS. 1A-1D. In particular, FIGS. 3A-3D illustrate the steps of patterning, etching, and releasing deterministic thin films. The handle wafer 105, the bilayer bonding interface 107, the sacrificial layer 109, the layer of BCB 111, and the thin film crystal layer 113 are labeled for reference in FIGS. 3A-3D. A 320 nanometer (nm) thick chromium (Cr) layer 301 is first deposited on the surface. The sample is then deposited with 300 nm PECVD SiO$_2$ and coated with 660 nm polymethyl methacrylate (PMMA) resist (not shown). The PMMA resist is patterned by EBL and serves as a mask to etch the PECVD SiO$_2$ layer by inductively coupled plasma reactive ion etching (ICP-RIE) using CHF$_3$ chemistry. In the example described herein, the patterns are in rectangular shapes with edge sizes in the range of hundreds of micrometers (e.g., of millimeter scale). It should be understood, however, that the patterns can be other shapes and/or sizes. The spacing between each rectangular pattern is 5 μm. After PMMA resist removal, the Cr mask is formed using the PECVD SiO$_2$ mask by ICP-RIE using Cl$_2$ and O$_2$ chemistry, as shown in FIG. 3A. The ion-sliced LiNbO$_3$ is then etched through to the BCB using the Cr mask by ICP-RIE using argon (Ar) and CHF$_3$ chemistry as shown in FIG. 3B. In other words, as shown in FIG. 3C, one or more trenches 303 are formed by etching in the thin film crystal layer 113 and the sacrificial layer 109. The trenches 303 are etched through to the layer of BCB 111. The etching rate of LiNbO$_3$ is 10 nm/minute and the etching selectivity to the Cr mask is 5:1. Five micron wide trenches are formed between each ion-sliced LiNbO$_3$ rectangular pattern.

After dry etching, the Cr mask is removed with CR-7S chromium etchant. Thereafter, the bilayer bonding interface 107 is etched via the trenches 303. The sample is then etched in 5% hydrofluoric (HF) acid to undercut the PECVD SiO$_2$ layer underneath the ion-sliced LiNbO$_3$ from the etched trenches between patterns as shown in FIG. 3C. The horizontal undercut etching rate is approximately 5 μm/min. Before the ion-sliced LiNbO$_3$ is fully released by etching, the LiNbO$_3$ sample is flipped to an unpolished silicon substrate and the etching is resumed with both substrates in the etchant. After etching for 12 min, the ion-sliced LiNbO$_3$ patterns break away from the SiO$_2$ pillar 309 (e.g., the portions of the sacrificial layer 109 remaining after etching). The samples are then rinsed in DI water and dried on a hotplate at 80° C., completing the transfer of the LiNbO$_3$ films to the unpolished silicon substrate as shown in FIG. 3D.

Figure 4B:
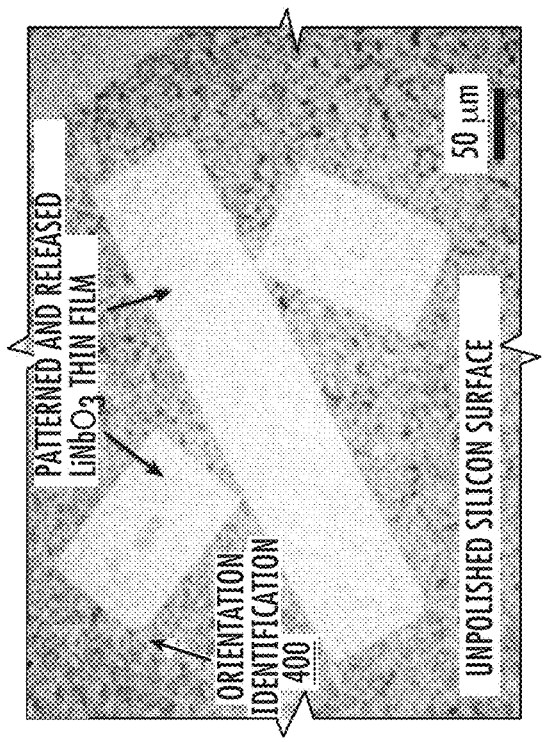
FIG. 4B illustrates released ion-sliced $LiNbO_3$ transferred to the unpolished surface of a silicon substrate.
Figure 4A:
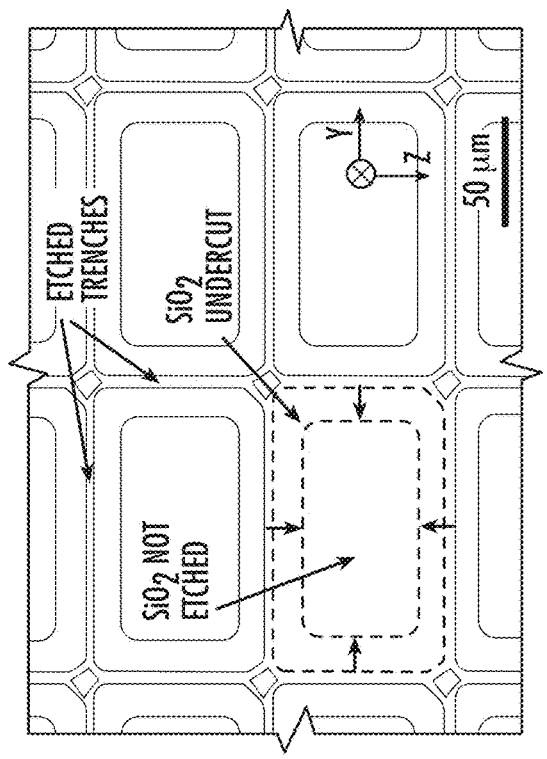
FIG. 4A illustrates HF acid etching of the patterned x-cut ion-sliced $LiNbO_3$.

FIG. 4A shows the undercut after etching for 4 minutes. In particular, FIG. 4A shows the SiO$_2$ undercut regions, which extend towards the center of the patterned thin films, and the regions of SiO$_2$ that are not etched, which form the SiO$_2$ pillars. FIG. 4B shows patterned ion-sliced LiNbO$_3$ on the silicon surface with edge lengths of 100 μm×150 μm and 100 μm×450 μm. The maximum pattern size achieved is 100 μm×2 mm. The z-axis of the crystal is along the short edges of the patterns. Orientation identification 400 can be provided to facilitate aligning crystal orientation. For example, as shown in FIG. 4B, one corner of the patterned thin films can be etched for orientation identification so that the crystal axes can be identified. This disclosure contemplates that the orientation identification 400 can be used to align an axis (e.g., x-, y-, or z-crystal axis of the deterministic thin film with a portion of an integrated optical device) Rapid thermal annealing (RTA) is then performed at 1000° C. for 30 seconds to repair the crystal lattice and restore the electro-optical properties of the ion-sliced LiNbO$_3$ [26].

Referring now to FIGS. 5A-5C, an example method of forming a deterministic thin film from a crystal substrate is shown. An ion implanted crystal substrate (e.g., LiNbO$_3$ thin film) can be bonded to a handle substrate (e.g., LiNbO$_3$ wafer). It should be understood that LiNbO$_3$ is used as an example and that other ferroelectrics, semiconductors, and/or crystals can be used including, but not limited to, lithium tantalate (LiTaO$_3$), barium titanate (BaTiO$_3$), strontium titanate (SrTiO$_3$), Bi$_{12}$SiO$_2$O (BSO), KTaO$_3$, silicon, germanium, gallium arsenide, indium gallium arsenide, silicon carbide, sapphire, potassium titanyl phosphate (KTP), and yttrium aluminum garnet (YAG) for electro-optics, nonlinear optics, and/or acousto-optics for wireless and optical applications. As discussed above with regard to FIGS. 1A-1D, He$^+$ ions are implanted into a surface of the crystal substrate to form a thin film crystal layer. When bonded, a bilayer bonding interface 507 is formed between the LiNbO$_3$ thin film and the LiNbO$_3$ wafer. For example, a sacrificial layer 509 (e.g., PECVD SiO$_2$) is deposited onto the surface of the crystal substrate, and a layer of benzocyclobutene (BCB) 511 is coated onto a surface of the handle substrate before the crystal and handle substrates are bonded. Optionally, the sacrificial layer can be a dielectric material or a metal. For example, the sacrificial layer can optionally be silicon dioxide (SiO$_2$), aluminum oxide (Al$_2$O$_3$), or titanium (Ti). This disclosure contemplates that the sacrificial layer can be a material other than SiO$_2$, Al$_2$O$_3$, or Ti. In addition, the handle substrate can be coated with other suitable materials (i.e., other than BCB) including, but not limited to, polymers, polyimides, and epoxies such as SU-8, polymethylmethacrylate (PMMA), polydimethylsiloxane (PDMS), methylsilsesquioxane (MSSQ), and polyetheretherketone (PEEK). Thereafter, the crystal substrate and the handle substrate are bonded through the sacrificial layer and the layer of BCB to form the bonding interface pair (e.g., the bilayer bonding interface 507), and the thin film crystal layer is exfoliated from the crystal substrate. This is shown by FIG. 5A.

As discussed above with regard to FIGS. 3A-3D, the thin film crystal layer is patterned to define a deterministic thin film, and one or more trenches 503 are etched in the thin film crystal layer and the sacrificial layer 509. This is shown by FIG. 5B. Thereafter, the sacrificial layer 509 is etched via the one or more trenches 503 as shown by FIG. 5C, which facilitates releasing the deterministic thin film from the handle substrate. This disclosure contemplates that a wet etching process can be used to remove the sacrificial layer 509. Optionally, wet etching includes using hydrofluoric (HF) acid in solution or vapor form, potassium hydroxide (KOH), or hydrogen chloride (HCl) acid as an etchant. The etching directions are shown by arrows in FIG. 5C (e.g., both from the side and underneath the sacrificial layer 509). This disclosure contemplates that dielectric, polymer, and/or metal etchants other than HF, HCl and KOH can be used. Due to the sacrificial/BCB double layer (e.g., the bilayer bonding interface 507), the etchant attacks not only the sacrificial layer 509 but also the sacrificial/BCB interface. This causes a minor openings 520 between the sacrificial layer 509 and the layer of BCB 511 as shown in FIG. 5C, which allows the etchant to etch from under the sacrificial layer 509 and speed up the etching process. This is in contrast to FIGS. 6A-6C.

Figure 6A:
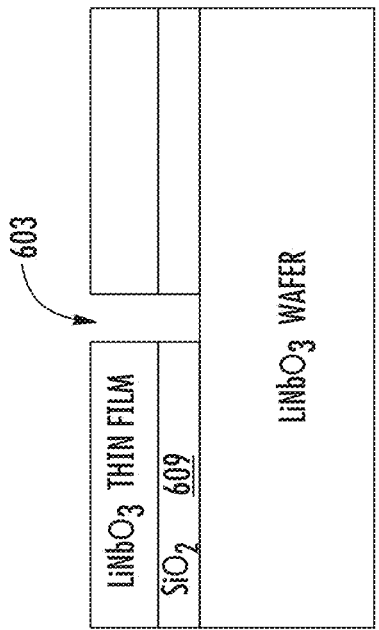
FIGS. 6A-6C illustrate a conventional etching process without a sacrificial/BCB double layer.
Figure 6B:
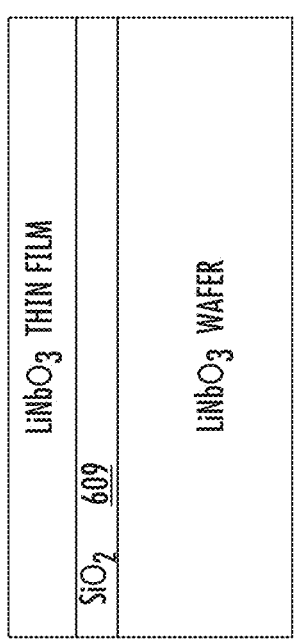
Figure 6C:
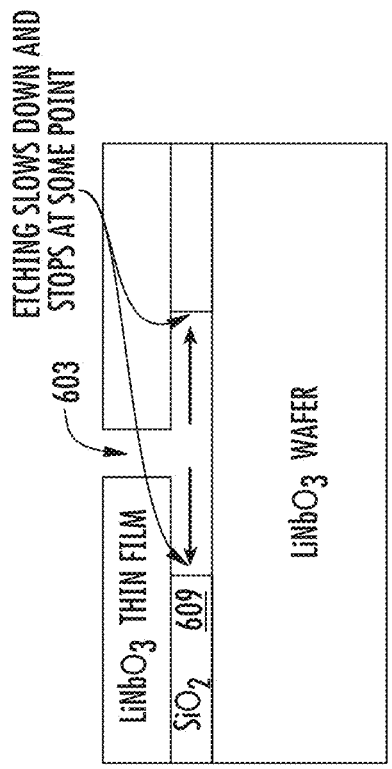

Referring now to FIGS. 6A-6C, a conventional etching process without a sacrificial/BCB double layer is shown. An ion implanted crystal substrate (e.g., LiNbO$_3$ thin film) can be bonded to a handle substrate (e.g., LiNbO$_3$ wafer). As discussed above with regard to FIGS. 1A-1D, He' ions are implanted into a surface of the crystal substrate to form a thin film crystal layer, and a sacrificial layer 609 (e.g., PECVD SiO$_2$) is deposited onto the surface of the crystal substrate. Thereafter, the crystal substrate and the handle substrate are bonded through the sacrificial layer 609, and the thin film crystal layer is exfoliated from the crystal substrate. This is shown by FIG. 6A. Unlike FIG. 5A, however, a layer of benzocyclobutene (BCB) is not coated onto a surface of the handle substrate, i.e., there is no sacrificial/BCB double layer in FIG. 6A.

As discussed above with regard to FIGS. 3A-3D, the thin film crystal layer is patterned to define a deterministic thin film, and one or more trenches 603 are etched in the thin film crystal layer and the sacrificial layer 609. This is shown by FIG. 6B. Thereafter, the sacrificial layer 609 is etched via the one or more trenches 603 as shown by FIG. 6C. With only a single sacrificial layer 609, the etching undercut slows down as the etching processes progresses and eventually stops because there is limited space for etching by-product exchange in the undercut channel. Thus, the depth/extent of the sacrificial layer 609 undercut is limited. Additionally, because the undercut speed is so slow, the bonded wafers must be etched for extended periods of time, which increases stress on the thin films and leads to cracking/breaking of the same. Accordingly, it is not possible to obtain large, crack-free, micrometer thick scale thin films using conventional etching processes.

Referring again to FIGS. 5A-5C, the sacrificial/BCB double layer (e.g., the bilayer bonding interface 507) allows the etchant to etch from under the sacrificial layer, as well as speeds up the etching process. In this way, the etchant extends farther and faster into the undercut channel. This results in the ability to obtain larger area patterned thin films as compared to conventional etching processes. Accordingly, the sacrificial/BCB double layer (e.g., the bilayer bonding interface 507) enables release of larger area thin films.

Figure 7A:
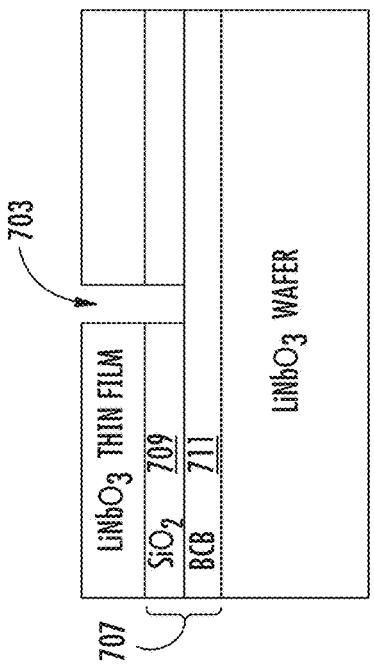
FIGS. 7A-7C illustrate another example method of forming a deterministic thin film from a crystal substrate.
Figure 7B:
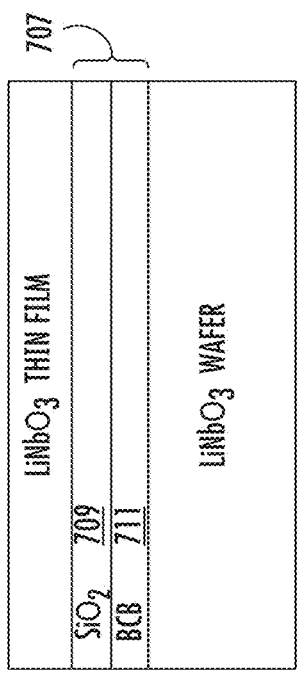
Figure 7C:
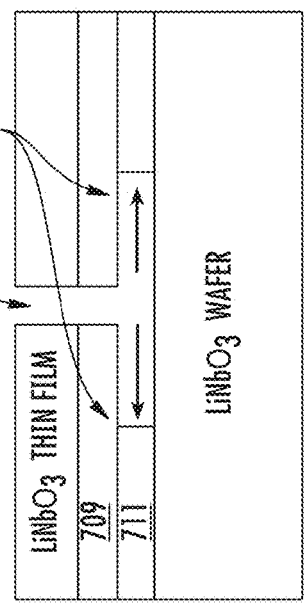

Referring now to FIGS. 7A-7C, another example method of forming a deterministic thin film from a crystal substrate is shown. An ion implanted crystal substrate (e.g., LiNbO$_3$ thin film) can be bonded to a handle substrate (e.g., LiNbO$_3$ wafer). As discussed above with regard to FIGS. 1A-1D, He ions are implanted into a surface of the crystal substrate to form a thin film crystal layer. When bonded, a bilayer bonding interface 707 is formed between the LiNbO$_3$ thin film and the LiNbO$_3$ wafer. For example, a sacrificial layer 709 (e.g., PECVD SiO$_2$) is deposited onto the surface of the crystal substrate, and a layer of benzocyclobutene (BCB) 711 is coated onto a surface of the handle substrate before the crystal and handle substrates are bonded. Optionally, the sacrificial layer 709 can be a dielectric material or a metal. For example, the sacrificial layer 709 can optionally be silicon dioxide (SiO$_2$), aluminum oxide (Al$_2$O$_3$), or titanium (Ti). This disclosure contemplates that the sacrificial layer 709 can be a material other than SiO$_2$, Al$_2$O$_3$, or Ti. Thereafter, the crystal substrate and the handle substrate are bonded through the sacrificial layer 709 and the layer of BCB 711 to form the bonding interface pair (e.g., the bilayer bonding interface 707), and the thin film crystal layer is exfoliated from the crystal substrate. This is shown by FIG. 7A.

As discussed above with regard to FIGS. 3A-3D, the thin film crystal layer is patterned to define a deterministic thin film, and one or more trenches 703 are etched in the thin film crystal layer and the sacrificial layer 709. This is shown by FIG. 7B. Thereafter, the layer of BCB 711 is etched via the one or more trenches 703 as shown by FIG. 7C. This disclosure contemplates that a dry etching process such as plasma etching can be used to remove the layer of BCB 711. This disclosure contemplates that dry etching processes other than plasma etching can be used. Thus, the sacrificial/BCB double layer (e.g., the bilayer bonding interface 707) facilitates release of the patterned thin films, which have a larger area as compared to those obtained using conventional etching processes. Accordingly, the sacrificial/BCB double layer (e.g., the bilayer bonding interface 707) enables release of larger area thin films.

Tunable Si/LiNbO$_3$ Racetrack Resonator

A tunable Si/LiNbO$_3$ racetrack resonator is designed and fabricated to demonstrate the integrated optics enabled by patterned ion-sliced LiNbO$_3$ with controllable shape and crystal orientation. As illustrated in FIGS. 8A-8F, x-cut ion-sliced LiNbO$_3$ is bonded to a silicon racetrack resonator as the top cladding. The bonding material is BCB. Co-planar metal electrodes are then patterned on the top of the LiNbO$_3$. The resonance wavelength is tuned by changing the refractive index of the LiNbO$_3$ via the linear electro-optic effect. A DC electric field is required to be applied along the z-axis of the LiNbO$_3$ to access the r$_{33}$ electro-optical coefficient.

Figure 8A:
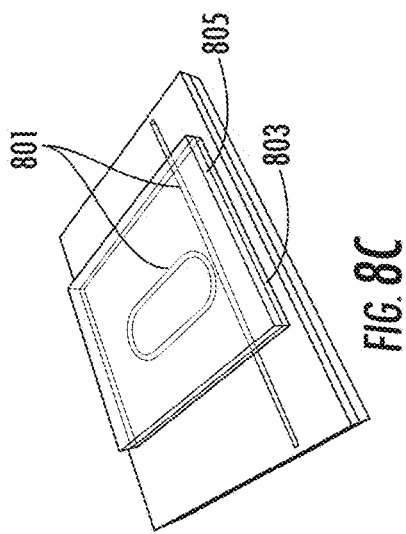
FIGS. 8A-8F illustrate fabrication process of an integrated optical device (e.g., a Si/$LiNbO_3$ racetrack resonator).
Figure 8B:
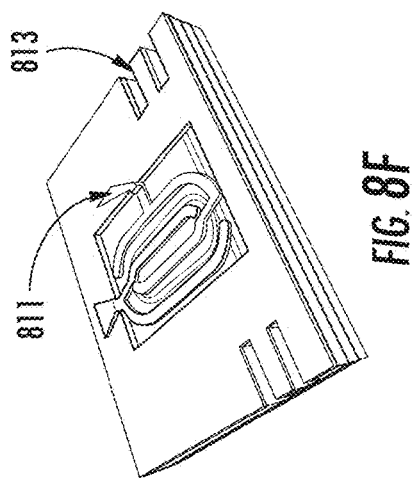
Figure 8C:
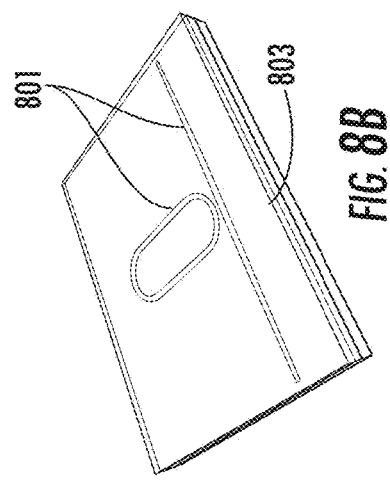

In FIG. 8A, a patterned substrate (e.g., a substrate having waveguides such as the racetrack resonator and bus waveguide patterned thereon) is shown. The patterned substrate in FIG. 8A is silicon on insulator (SOI). SOI is well known in the art. For example, SOI can include a relatively thick silicon handle wafer (e.g., thickness of 500 µm to 1 mm) with a relatively thin film of silicon dioxide (SiO$_2$) (e.g., thickness of 1 µm) layered on top of the handle wafer. A relatively thin film of silicon (e.g., thickness 200-300 nm) is layered on top of the thin film $SiO_2$. One or more waveguides (e.g., racetrack and bus waveguides 801 in FIG. 8A) are patterned into the silicon. It should be understood that SOI is provided only as an example. This disclosure contemplates that other patterned substrates (e.g., other materials) can be used including, but not limited to, a silicon handle wafer layered with a thin film of silicon dioxide layered with silicon nitride (with waveguides patterned into the silicon nitride). Deterministic thin film(s) (e.g., thin film $LiNbO_3$ as described herein) can be picked-and-placed on the patterned substrate (e.g., as shown in FIG. 8C). It should be understood that the deterministic thin film serves as cladding for the optical waveguides. Optionally, optical waveguides can be patterned in the deterministic thin film prior to, or after, bonding to the patterned substrate. Example optical waveguides that can be patterned in the deterministic thin film include, but are not limited to, ridge waveguide cores, rib waveguide cores, strip waveguide cores, titanium diffused waveguides, and waveguides formed by proton exchange.

The silicon waveguides 801 are patterned from hydrogen silsesquioxane (HSQ) resist using EBL and ICP-RIE [27] as shown in FIG. 8A. The waveguide width is 550 nm and the coupling gap between the bus waveguide 801a and the racetrack 801b is 180 nm. As shown in FIG. 8B, the sample is coated with 250 nm thick BCB 803 and then baked in a $N_2$ ambient at 150° C. for one hour to planarize the surface. Next, the sample is heated to and held at 190° C. for 15 minutes to partially cure the BCB. Partial curing helps prevent BCB reflow that may occur after bonding [28]. The BCB is then etched back to a 170 nm thickness using ICP-RIE with $O_2$ and $CF_4$ chemistry. As shown in FIG. 8C, $LiNbO_3$ samples 805 (e.g., deterministic thin films) prepared on a silicon substrate are transferred to the silicon racetrack using a glass micro-vacuum tip on a probe station. This disclosure contemplates that the $LiNbO_3$ samples 805 can be formed as described above, for example with reference to FIGS. 1A-1D, 3A-3D, 5, and/or 7. After forming the deterministic thin films, they can be picked-and-placed on the silicon substrate as described herein. Additionally, an orientation identification line, which is created during the formation process as described herein, can be used to align the crystal axis of the deterministic thin film with the underlying circuit features. The micro-vacuum tip has a hose diameter of 25 µm and is connected to a vacuum source by plastic tubing. The z-axis of the $LiNbO_3$ along the short edge of the pattern is aligned to the bus waveguide. The sample is baked at 250° C. to cure the BCB and complete the bonding.

Figure 8D:
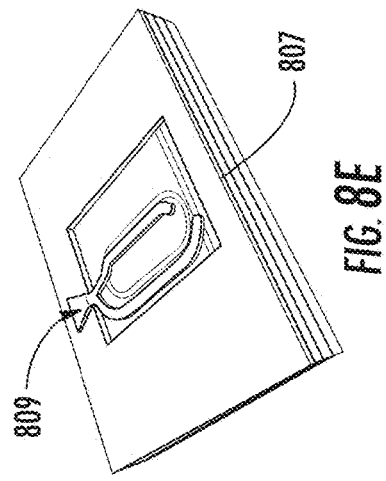
Figure 8E:
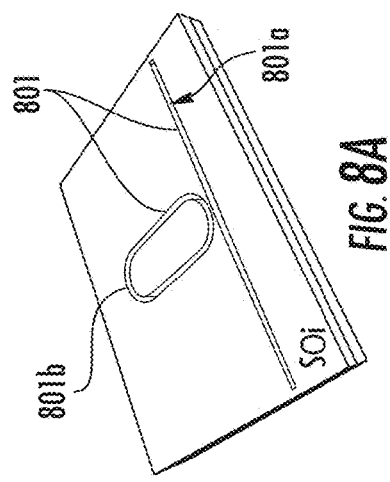
Figure 8F:
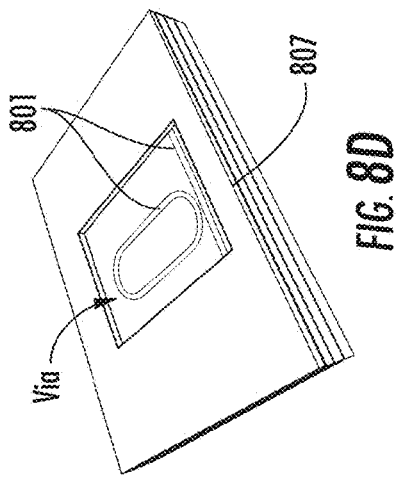

After bonding, as shown in FIG. 8D, the sample is capped with 1 µm thick PECVD $SiO_2$ 807. An access hole (the "via" in FIG. 8D) is formed by removing the $SiO_2$ film over the racetrack resonator using ICP-RIE. The thickness of $LiNbO_3$ in the access hole is reduced to around 900 nm during the plasma etching. As shown in FIG. 8E, three-hundred nanometer thick aluminum (Al) electrodes 809 are patterned in the access hole with a two-step lithography process to accurately control the narrow electrode gap. The signal electrode is first formed. Then, as shown in FIG. 8F, the ground electrode 811 is aligned to the signal electrode in the second lithography step. A 1 µm wide electrode gap is formed with an alignment error smaller than 50 nm. Finally, cantilever couplers 813 are patterned for fiber-to-chip optical coupling [29].

Figure 9B:
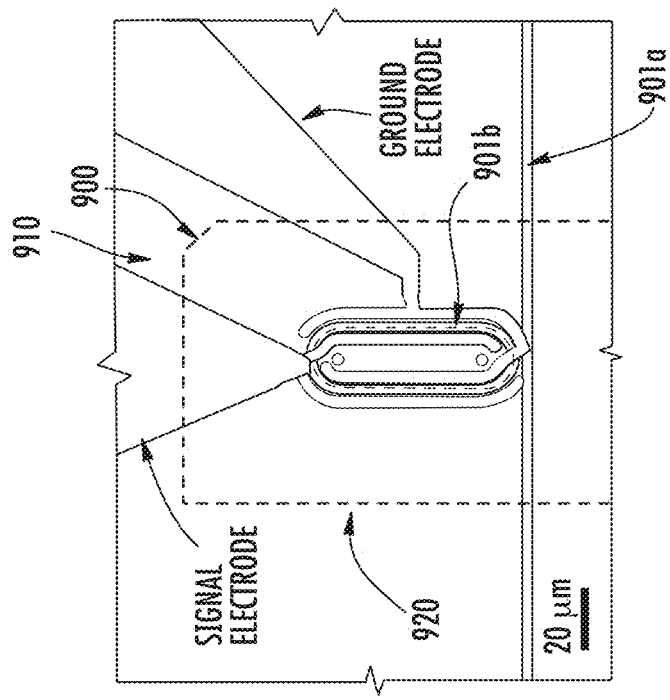
FIGS. 9A and 9B illustrates top-view optical micrograph of fabricated Si/$LiNbO_3$ racetrack resonator.
Figure 9A:
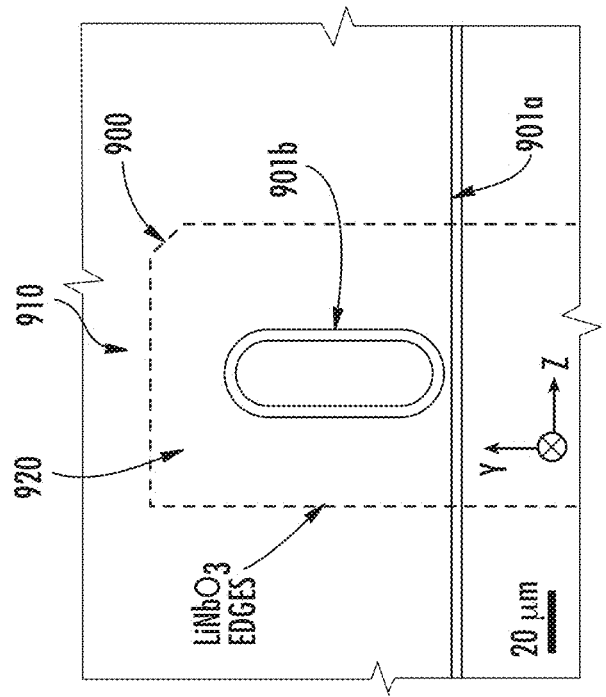

An example heterogeneous integrated photonic device is described herein with regard to FIGS. 9A and 9B, which show top-view optical micrographs of an example fabricated device after bonding and electrode patterning. Similar to above, the heterogeneous integrated optical device can be at least one of a modulator, a switch, a sensor, an amplifier, a polarization rotator, a tunable filter, a wavelength converter, a photodetector, a light emitting diode, or a laser. FIG. 9A is an image of device after bonding of the $LiNbO_3$ (e.g., a deterministic thin film as described herein) to a patterned substrate such as SOI. As described above, the patterned substrate has one or more waveguides patterned therein. In FIG. 9A, the orientation identification line 900 is shown, which facilitates alignment of crystal orientation. FIG. 9B is an image of device after patterning of the electrodes. With reference to FIGS. 9A and 9B, the heterogeneous integrated photonic device can include a silicon substrate 910 having a waveguide patterned on a surface thereof. For example, the silicon substrate 910 can have a bus waveguide 901a and a racetrack resonator 901b (e.g., similar to FIGS. 8A-8F) patterned on a surface thereof. In other words, substrate 910 is a patterned substrate. Additionally, an x-cut thin film crystal 920 is arranged on the silicon substrate. It should be understood that the x-cut thin film crystal 920 can be a deterministic thin film produced as described herein, for example, as described with respect to FIGS. 1A-1D, 3A-3D, 5, and/or 7. The x-cut thin film crystal 920 can be picked-and-placed on the silicon substrate 910. Additionally, when using an x-cut thin film crystal as opposed to a z-cut crystal, optical waves propagating in the transverse electric (TE) modes can utilize the largest electro-optic (EO) coefficient in the $LiNbO_3$. TE modes are widely used in silicon photonics because silicon waveguides are more easily manufactured with longer widths when compared to their height. TE modes are also compatible with single layer co-planar electrodes for electrical actuation, simplifying the electrical design. As shown in FIGS. 9A and 9B, the x-cut thin film crystal 920 can at least partially overlap with the waveguide.

As described above, the orientation identification line 900 of the x-cut thin film crystal 920 can be used to align the crystal orientation. Thus, respective polarization directions of an electric field and an optical field of the device can be made co-linear. As used herein, "electric field" is the electric field from a relatively low frequency electrical voltage (e.g., terahertz frequencies and below), and "optical field" is the electric field from a higher frequency optical wave (e.g., hundreds of terahertz in frequency such as an optical wave with 1.55 µm wavelength having a frequency of 193 terahertz). It should be understood that z-crystal axis of the crystal (e.g., $LiNbO_3$) has the largest electro-optical (EO) coefficient. Accordingly, it is advantageous to design and create the device with the z-crystal axis perpendicular to the longest edge of the racetrack resonator 901b in the device of FIGS. 9A and 9B. The methods described herein facilitate the ability to produce x-cut thin films with deterministic size, shape, and crystal orientation, as well as align the crystal orientation.

In the integrated photonic devices described herein, the optical mode can propagate in primarily in transverse electric (TE) or transverse magnetic (TM) modes. It should be understood that the mode can be pre-selected by adjusting the input polarization state. Additionally, for a certain crystal cut, there is an optimal polarization direction (or optical mode) that can access the largest EO coefficient from the crystal. For example, for z-cut crystals, the TM mode is optimal because the optical electric field is oriented in the z orientation. The TE mode can also be used, although the EO coefficient that is utilized is not as large. As described herein, thin films with deterministic size, shape, and crystal orientation can be produced. Therefore, using the techniques described herein, which provide control over crystal orientation, it is possible to control angular orientation of the polarization of the electric fields (e.g., the electrical and optical fields of the device). Optionally, in some implementations, respective electric fields (i.e., the polarization of the electric fields) can be made co-linear, which is discussed above with regard to FIGS. 9A-9B. Although electronic and optical frequencies are important as the two signals, more generally, the two electric fields can also both be at optical frequencies (for nonlinear optical applications such as harmonic generation, sum frequency generation, difference frequency generation, and wave mixing, for example). Optionally, in some implementations, it can be desirable for the polarization of the electric fields to be orthogonal, or even oriented at an arbitrary angle other than 0 or 90 degrees. Having control over crystal orientation using the techniques described herein makes this possible.

Figure 10A:
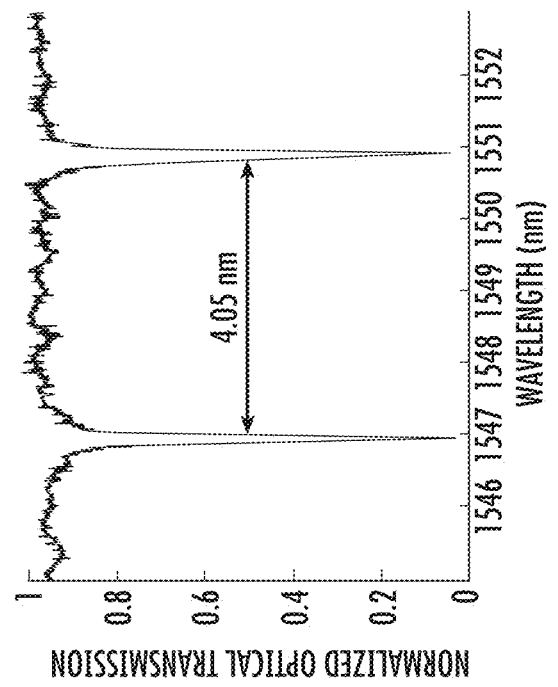
FIGS. 10A and 10B illustrate measurements of Si/$LiNbO_3$ racetrack resonator.
Figure 10B:
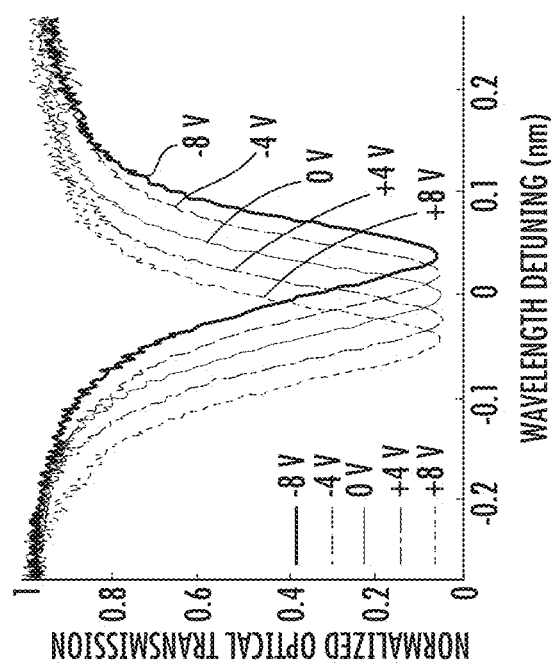

FIG. 10A shows the measured TE-mode optical transmission spectrum of two consecutive resonances. The free spectral range (FSR) is 4.05 nm, the group index is 3.65, and the loaded quality factor is 15,500. FIG. 10B shows the resonance near 1551 nm of the Si/LiNbO$_3$ racetrack as a function of the applied DC voltage between the electrodes. The resonance wavelength blueshifts linearly with increasingly positive voltage, indicating the refractive index is decreased, consistent with the relative orientation of the applied electric field and the z-axis of LiNbO$_3$. The resonance is tuned by 83.5 μm for a voltage range of 16 V, resulting in a tunability of 5.2 μm/V. The $r_{33}$ electro-optic coefficient of the ion-sliced LiNbO$_3$ is estimated to be 25.7 μm/V based on the measured tunability, which is 83% of the bulk value.

Conclusion

A method to realize patterned ion-sliced LiNbO$_3$ for hybrid photonic integration on silicon is described herein. In contrast to random platelets obtained from wet etching and thermal blistering techniques, areal LiNbO$_3$ patterns with deterministic size, shape, and crystal axis orientation are obtained. A tunable hybrid silicon and LiNbO$_3$ racetrack resonator with co-planar electrodes is implemented to demonstrate the method. The tunability of the resonator is 5.2 μm/V. The ion sliced LiNbO$_3$ patterns are transferred to silicon waveguides using a pick-and-place process. A platform is envisioned to realize versatile communications, computing, and sensing based on high density electronic and photonic integration on the chip scale. Furthermore, the method can be applied to other applications including flexible photonics, thin film waveplates, and hybrid integration with silica planar lightwave circuits. Applying the technique for thin films of other materials, such as LiTaO$_3$ and BaTiO$_3$, creates opportunities for electro-optics, nonlinear optics, and acousto-optics in a variety of hybrid platforms for both optical and radio-frequency (RF) applications [36, 37].

The hybrid integration of ion-sliced lithium niobate and silicon waveguides enable compact hybrid integrated optics leveraged by the second order susceptibility of lithium niobate. Compared to state-of-the-art lithium niobate integrated optic devices on the bulk lithium niobate substrate, the devices described herein have a footprint three orders of magnitude smaller, thanks to the much high optical confinements provided by the silicon waveguide core.

The high optical confinement and the integrated electrode design enable large voltage-induced electric fields in the lithium niobate and large phase tuning efficiency. The tunable racetrack resonator described herein demonstrate $V_\pi L$ value of 5.7 V cm in the tunable device, much better than the traditional lithium niobate modulators with $V_\pi L$ values in the range of 6 to 10 V cm. The method described herein enables micrometer scale integrated voltage controlled integrated photonic devices including electrically tunable optical filters, switches, wavelength converters, photodetectors, light emitting diodes, lasers, and high speed and high linearity modulators for optical communications, sensing, next generation computing, and optical interconnects that leverage the convergence of silicon electronics with photonics.

REFERENCES

1. R. A. Soref, "The past, present and future of silicon photonics," IEEE J. Sel. Top. Quantum Electron. 12(6), 1678-1687 (2006).
2. M. J. R. Heck, H.-W. Chen, A. W. Fang, B. R. Koch, D. Liang, H. Park, M. Sysak, and J. E. Bowers, "Hybrid Silicon Photonics for Optical Interconnects," IEEE J. Sel. Top. Quantum Electron. 17(2), 333-346 (2011).
3. Y. H. Kuo, Y. K. Lee, Y. Ge, S. Ren, J. E. Roth, T. I. Kamins, D. A. Miller, and J. S. Harris, "Strong quantum-confined Stark effect in germanium quantum-well structures on silicon," Nature 437(7063), 1334-1336 (2005).
4. C. Koos, P. Vorreau, T. Vallaitis, P. Dumon, W. Bogaerts, R. Baets, B. Esembeson, I. Biaggio, T. Michinobu, F. Diederich, W. Freude, and J. Leuthold, "All-optical high-speed signal processing with silicon organic hybrid slot waveguides," Nat. Photonics 3(4), 216-219 (2009).
5. S. Abel, T. Stöferle, C. Marchiori, C. Rossel, M. D. Rossell, R. Erni, D. Caimi, M. Sousa, A. Chelnokov, B. J. Offrein, and J. Fompeyrine, "A strong electro-optically active lead-free ferroelectric integrated on silicon," Nat. Commun. 4, 1671 (2013).
6. R. M. Briggs, I. M. Pryce, and H. A. Atwater, "Compact silicon photonic waveguide modulator based on the vanadium dioxide metal-insulator phase transition," Opt. Express 18(11), 11192-11201 (2010).
7. M. Liu, X. Yin, E. Ulin-Avila, B. Geng, T. Zentgraf, L. Ju, F. Wang, and X. Zhang, "A graphene-based broadband optical modulator," Nature 474(7349), 64-67 (2011).
8. A. W. Fang, H. Park, O. Cohen, R. Jones, M. Paniccia, J. E. Bowers, "Electrically pumped hybrid AlGaInAs-silicon evanescent laser," Opt. Express 14(20), 9203-9210 (2006).
9. Y. H. Kuo, H. W. Chen, and J. E. Bowers, "High speed hybrid silicon evanescent electroabsorption modulator," Opt. Express 16(13), 9936-9941 (2008).
10. J. Michel, J. Liu, and L. C. Kimerling, "High-performance Ge-on-Si photodetectors," Nat. Photonics 4(8), 527-534 (2010).
11. J. N. Caspers, M. Z. Alam, and M. Mojahedi, "Compact hybrid plasmonic polarization rotator," Opt. Lett. 37(22), 4615-4616 (2012).
12. P. Rabiei, J. Ma, S. Khan, J. Chiles, and S. Fathpour, "Heterogeneous lithium niobate photonics on silicon substrates," Opt. Express 21(21), 25573-25581 (2013).
13. Y. S. Lee, G.-D. Kim, W.-J. Kim, S.-S. Lee, W.-G. Lee, and W. H. Steier, "Hybrid Si—LiNbO$_3$ microring electro-optically tunable resonators for active photonic devices," Opt. Lett. 36(7), 1119-1121 (2011).
14. L. Chen and R. M. Reano, "Compact electric field sensors based on indirect bonding of lithium niobate to silicon microrings," Opt. Express 20(4), 4032-4038 (2012).

15. L. Chen, M. G. Wood, and R. M. Reano, "12.5 pm/V hybrid silicon and lithium niobate optical microring resonator with integrated electrodes," Opt. Express 21(22), 27003-27010 (2013).
16. L. Chen, Q. Xu, M. G. Wood, and R. M. Reano, "Hybrid silicon and lithium niobate electro-optical ring modulator," Optica 1, 112-118 (2014).
17. L. Chen, M. G. Wood, R. M. Reano, "Compensating thermal drift of hybrid silicon and lithium niobate ring," Opt. Lett. 40(7), 1599-1602 (2015).
18. L. Chen, J. Chen, J. Nagy, R. M. Reano, "Highly linear ring modulator from hybrid silicon and lithium niboate," Opt. Express 23(10), 13255-13264 (2015).
19. E. L. Wooten, K. M. Kissa, A. Y. Yan, E. J. Murphy, D. A. Lafaw, P. F. Hallemeier, D. Maack, D. V. Attanasio, D. J. Fritz, G. J. McBrien, and D. E. Bossi, "A review of lithium niobate modulators for fiber-optic communications systems," IEEE J. Sel. Top. Quantum Electron. 6(1), 69-82 (2000).
20. K. K. Wong, *Properties of Lithium Niobate* (INSPEC, 2002).
21. R. S. Weis and T. K. Gaylord, "Lithium niobate: summary of physical properties and crystal structure," Appl. Phys., A Mater. Sci. Process. 37(4), 191-203 (1985).
22. M. Levy, R. M. Osgood, Jr., R. Liu, L. E. Cross, G. S. Cargill, A. Kumar, and H. Bakhru, "Fabrication of single-crystal lithium niobate films by crystal ion slicing," Appl. Phys. Lett. 73(16), 2293-2295 (1998).
23. F. Schrempel, T. Gischkat, H. Hartung, T. Höche, E. B. Kley, A. Tünnermann, and W. Wesch, "Ultrathin membranes in x-cut lithium niobate," Opt. Lett. 34(9), 1426-1428 (2009).
24. M. Koechlin, F. Sulser, Z. Sitar, G. Poberaj, and P. Günter, "Free-standing lithium niobate microring resonators for hybrid integrated optics," IEEE Photon. Technol. Lett. 22(4), 251-253 (2010).
25. A. Guarino, G. Poberaj, D. Rezzonico, R. Degl'Innocenti, and P. Günter, "Electro-optically tunable microring resonators in lithium niobate," Nat. Photonics 1(7), 407-410 (2007).
26. P. Rabiei and P. Gunter, "Optical and electro-optical properties of submicrometer lithium niobate slab waveguides prepared by crystal ion slicing and wafer bonding," Appl. Phys. Lett. 85(20), 4603-4605 (2004).
27. M. Wood, L. Chen, J. R. Burr, and R. M. Reano, "Optimization of electron beam patterned hydrogen silsesquioxane mask edge roughness for low-loss silicon waveguides", J. Nanophoton. 8(1), 083098 (2014).
28. F. Niklaus, R. Kumar, J. J. McMahon, J. Yu, J.-Q. Lu, T. S. Cale, and R. J. Gutmann, "Adhesive wafer bonding using partially cured benzocyclobutene for three-dimensional integration," J. Electrochem. Soc. 153(4), G291-G295 (2006).
29. P. Sun and R. M. Reano, "Cantilever couplers for intra-chip coupling to silicon photonic integrated circuits," Opt. Express 17(6), 4565-4574 (2009).
30. S.-I. Park, Y. Xiong, R.-H. Kim, P. Elvikis, M. Meitl, D.-H. Kim, J. Wu, J. Yoon, C.-J. Yu, Z. Liu, Y. Huang, K.-C. Hwang, P. Fereira, X. Li, K. Choquette, and J. A. Rogers, "Printed assemblies of inorganic light-emitting diodes for deformable and semitransparent displays," Science, 325(5943), 977-981 (2009).
31. J. A. Rogers, M. G. Lagally, and R. G. Nuzzo, "Synthesis, assembly and applications of semiconductor nanomembranes," Nature 477(7362), 45-53 (2011).
32. J. Hu, L. Li, H. Lin, P. Zhang, W. Zhou, and Z. Ma, "Flexible integrated photonics: where materials mechanics and optics meet," Opt. Mater. Express 3(9), 1313-1331 (2013).
33. R. M. Roth, T. Izuhara, R. L. Espinola, D. Djukic, R. Osgood, S. Bakhur, H. Bakhru, "Integrable wide-free-spectral-range Fabry-Perot optical filters using free-standing LiNbO$_3$ thin films," Opt. Lett. 30(9), 994-996 (2005).
34. A. M. Radojevic, R. M. Osgood, Jr., M. Levy, A. Kumar, and H. Bakhru, "Zeroth-order half-wave plates of LiNbO$_3$ for integrated optics applications at 1.55 μm," IEEE Photon. Technol. Lett. 12(12), 1653-1655 (2000).
35. H. Yamazaki, T. Yamada, K. Suzuki, T. Goh, A. Kaneko, A. Sano, E. Yamada, and Y. Miyamoto, "Integrated 100-Gb/s PDM-QPSK modulator using a hybrid assembly technique with silica-based PLCs and LiNbO$_3$ phase modulators," in Proc. Eur. Conf. Opt. Commun., September 2008, Paper Mo.3.C.1.
36. A. Reinhardt, L. Benaissa, J. Davis, N. Lamard, V. Kovacova, N. Boudou, E. Defaÿ, "Acoustic filters based on thin single crystal LiNbO$_3$ films: status and prospects," in 2014 IEEE International Ultrasonics Symposium Proceedings, 773-781, (2014).
37. T. Izuhara, I.-L. Gheorma, R. M. Osgood, A. N. Roy, H. Bakhru, Y. M. Tesfu, and M. E. Reeves, "Single-crystal barium titanate thin films by ion slicing," Appl. Phys. Lett. 82(4), 616-618 (2003).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method of forming a deterministic thin film from a crystal substrate, comprising:
   implanting ions into a surface of the crystal substrate to form a thin film crystal layer;
   bonding the crystal substrate and a handle substrate to form a bilayer bonding interface between the crystal substrate and the handle substrate, wherein the bilayer bonding interface comprises at least two different materials;
   exfoliating the thin film crystal layer from the crystal substrate;
   patterning the thin film crystal layer to define a deterministic thin film;
   etching one or more trenches in the thin film crystal layer;
   etching the at least two different materials of the bilayer bonding interface via the one or more trenches, wherein etching the bilayer bonding interface creates a channel between the at least two different materials; and
   releasing the deterministic thin film from the handle substrate.

2. The method of claim 1, wherein the deterministic thin film has deterministic size, shape, and crystal orientation.

3. The method of claim 2, wherein the deterministic thin film comprises at least one edge having a length greater than 0.1 micrometers (μm).

4. The method of claim 2, wherein the deterministic thin film comprises an area greater than 0.01 square micrometers (μm).

5. The method of claim 1, wherein the deterministic thin film has a thickness greater than 100 nanometers (nm).

6. The method of claim 1, wherein the deterministic thin film is x-cut, y-cut, or z-cut.

7. The method of claim 1, wherein patterning the thin film crystal layer to define a deterministic thin film further comprises providing an orientation identification line for aligning crystal orientation.

8. The method of claim 1, further comprising:

depositing a sacrificial layer onto the surface of the crystal substrate; and coating a layer of benzocyclobutene (BCB) onto a surface of the handle substrate, wherein the sacrificial layer and the layer of BCB form the bilayer bonding interface.

9. The method of claim 8, wherein etching the bilayer bonding interface via the one or more trenches further comprise wet etching the sacrificial layer.

10. The method of claim 9, wherein wet etching further comprises using hydrofluoric (HF) acid, potassium hydroxide (KOH), or hydrogen chloride (HCl) acid as an etchant.

11. The method of claim 8, wherein etching the bilayer bonding interface via the one or more trenches further comprises dry etching the layer of BCB.

12. The method of claim 11, wherein dry etching further comprises plasma etching.

13. The method of claim 8, wherein the sacrificial layer comprises a dielectric material or a metal.

14. The method of claim 13, wherein the sacrificial layer comprises silicon dioxide ($SiO_2$), aluminum oxide ($Al_2O_3$), or titanium (Ti).

15. The method of claim 1, wherein the crystal substrate is lithium niobate ($LiNbO_3$), lithium tantalate ($LiTaO_3$), barium titanate ($BaTiO_3$), strontium titanate ($SrTiO_3$), $Bi_{12}SiO_2O$ (BSO), $KTaO_3$, silicon, germanium, gallium arsenide, indium gallium arsenide, silicon carbide, sapphire, potassium titanyl phosphate (KTP), or yttrium aluminum garnet (YAG).

* * * * *